United States Patent [19]
Fukushima et al.
[11] Patent Number: 4,775,574
[45] Date of Patent: Oct. 4, 1988

[54] COVERING MEMBER OF KEYBOARD AND A BASE PLATE THEREFOR

[75] Inventors: Masami Fukushima; Kazutoki Tahara, both of Saitama, Japan

[73] Assignee: Shin Etsu Polymer Co., Ltd., Tokyo, Japan

[21] Appl. No.: 37,393

[22] Filed: Apr. 10, 1987

[30] Foreign Application Priority Data

| | | | |
|---|---|---|---|
| Apr. 14, 1986 | [JP] | Japan | 61-85487 |
| May 2, 1986 | [JP] | Japan | 61-102286 |
| May 2, 1986 | [JP] | Japan | 61-102287 |
| May 2, 1986 | [JP] | Japan | 61-102288 |

[51] Int. Cl.⁴ .......... B32B 3/00; G10H 1/00; G10H 3/00

[52] U.S. Cl. .......... 428/209; 428/901; 84/1.01; 84/1.14; 84/DIG. 22; 357/65

[58] Field of Search .......... 84/1.01, 1.14, DIG. 7, 84/DIG. 8, DIG. 22; 357/65, 80; 428/209, 901

[56] References Cited

U.S. PATENT DOCUMENTS

| | | | |
|---|---|---|---|
| 3,890,480 | 6/1975 | Berling et al. | 200/302 |
| 3,921,167 | 11/1975 | Fox | 361/398 |
| 3,964,593 | 6/1976 | Pointon | 400/491.3 |
| 4,359,612 | 11/1982 | Rooney | 200/5 R |
| 4,619,175 | 10/1986 | Matsuzaki | 84/1.01 |

*Primary Examiner*—John E. Kittle
*Assistant Examiner*—P. J. Ryan
*Attorney, Agent, or Firm*—Hopgood, Calimafde, Kalil, Blaustein & Judlowe

[57] ABSTRACT

A covering member of keyboard prepared by separately fixing the push button elements to a base plate instead of integral molding is disclosed in which the plate has openings arranged conforming to the pattern of the fixed contact points on the circuit board. Fixing is carried out by using a silicone rubber-based adhesive or a pressure-sensitive adhesive optionally with the aid of tailing of protrusions on the base plate into the cavity of the base of the push button elements. A method of using unit bodies carrying push button elements is alternatively used. A base plate having openings arranged in the pattern corresponding to the fixed contact points is also disclosed for use in fixing the push button elements.

6 Claims, 7 Drawing Sheets

COVERING MEMBER OF KEYBOARD AND A BASE PLATE THEREFOR

BACKGROUND OF THE INVENTION

The present invention relates to a covering member of a keyboard and a base plate therefor to which push button elements are set up. The invention relates particularly to a keyboard covering member having push button elements fixed directly to the base plate or having a unit body carrying a push button element fixed thereto. The keyboard is useful for push button input or keyboard input of electric or electronic signals to electric or electronic instruments.

In the prior art, many of electric or electronic instruments are usually combined with a push button input unit or a keyboard input unit composed of a circuit board carrying a plural number of fixed electrode contacts connected by circuit wirings and a covering member having an integrated structure with movable push button elements confronting the fixed electrode contacts. The assembling work in the manufacture of push button input units or keyboard input units involving printed circuit boards is markedly simplified by the use of such covering members. Covering members of keyboards of such a type are usually manufactured by a process including successive steps of putting movable contact elements made of vulcanized electroconductive rubber on the bottoms of each of cavities in the metal mold for the covering member conforming to the arrangement pattern of the fixed contacts of the circuit board and overlaying an unvulcanized insulating rubber base followed by vulcanization of the same under pressure and heating. Accordingly, a separately prepared metal mold is required for each type of the covering members in order to manufacture covering members of keyboards set up with even one or irregularly shaped or arranged push button element. The renewal of the metal mold is quite troublesome involving repeated trials and errors in designing, fabrication, readjustment and inspection with anticipation of the effects of the irregular portions in the covering member on the size change of the whole molded articles during or after molding or in the lapse of time during use. Such a disadvantage is a heavy burden particularly in the case of manufacture of large sized covering members in which matching in the position of the fixed electrode contacts and the movable contacts becomes increasingly difficult. The difficulty is derived form shrinkage in the molding process and expansion or contraction during use. For example, large sized covering members having a relatively large length of 20 to 50 cm or even larger are used in the preparation of large sized keyboard input units or push buttom input units for operation boards of, e.g., electric typewriters or electric cash registers. In the manufacture of such large sized covering members, shrinkage in the molding process and expansion or contraction during use can be as large as several percent relative to the size of the metal mold to cause mismatching in the position which may induce poor performance of the instrument. Taking account of the above, a measure for overcoming the difficulty in the positional matching is to use a metal mold having cavities with a marginal allowance based on the estimation of the molding shrinkage and expansion or contraction during use. Nonetheless, the positional matching with precision is still considered to be a difficult matter since the degree of molding shrinkage varies depending on the nature of the material in addition to the size and shape of the covering member in a sheet form and, furthermore, as a result of a small difference in the molding temperature and the processing time even when the materials are the same and also due to variation in the quality of the material between different lots.

Manufacture of large sized covering members of keyboard is also accompanied by a disadvantages of progressively increasing cost for the preparation of the metal mold as compared with the metal molds for smaller-sized covering members having dimensions, of, for example, 5 cm by 10 cm and also for a correspondingly large compression molding machine.

In addition, another drawback is involved in the prior art method of manufacture of covering members having differently colored push button elements to comply with the increasing demand in recent years in which simultaneous putting of an unvulcanized insulating rubber base with the conforming color in the cavities of the mold followed by vulcanization to cause mingling of the colorants on the boundary portions. Therefore, color arrangement of the molded products sometimes deviates from the intended design to decrease the adaptability to small-scale production of different kinds of products due to the marked decrease in the yield of acceptable products with an accordingly increasing cost.

SUMMARY OF THE INVENTION

The present invention provides a covering member of keyboard comprising a base plate having a plurality of openings and a plurality of push button elements each fixed to the peripheral zone of the opening of the base plate by adhesively bonding using an adhesive such as a silicone-based rubbery adhesive and a pressure-sensitive adhesive, optionally, with an aid of tailing of a protrusion into a cavity, the openings being arranged to conform with the arrangement pattern of the push button elements.

The invention also provides a covering member of keyboard comprising a base plate having a plurality of openings and a unit body carrying a plurality of push button elements each fixed to the peripheral zone of one of the openings of the base plate.

The invention further provides a base plate of a covering member of keyboard mountable on a circuit board having a plurality of openings arranged in conformity with the arrangement pattern of fixed contact points set up on the circuit board.

DETAILED DESCRIPTION OF THE PREFERRED EMBODIMENTS

Figure 1:
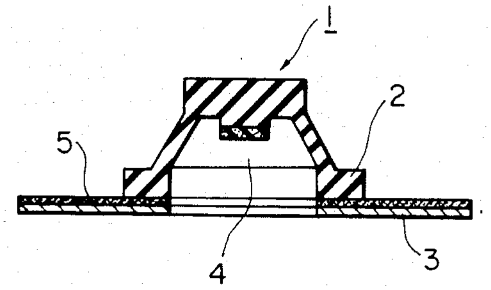
FIG. 1 is a longitudinal cross-section of an essential part of a covering member of keyboard prepared by fixing a push button covering member onto a base plate according to the invention.

The inventors have carried out extensive studies on the manufacturing method of covering members of keyboard having adaptability even to a small-scale production of different kinds of models at low costs from diversified points of view thus completing the present invention which excludes the prior art method of integral molding of a plural number of pre-vulcanized push button elements with a supporting base member and including the step of arranging a number of preformed push button elements or at least one of the unit bodies each carrying at least one of the push button elements at the portion of portions of the openings formed in the base plates of the covering member conforming to the pattern of the push button arrangement followed by adhesive bonding by using an adhesive.

In one of the preferred models of the present invention, a number of push button elements are prepared and arranged in the openings of the base plate punched beforehand in a prescribed pattern followed by adhesive bonding to the base plate. In the bonding work, the peripheral zones of the openings are coated with an unvulcanized silicone-based rubbery adhesive or a pressure-sensitive adhesive and then the push button elements are mounted on the base plate in contact with the layers of the adhesive. Alternatively, a method of overlaying a layer of silicone rubber on the base plate is suitably used. In the case of using an unvulcanized silicone rubber, the push button elements are fixed to the base plate by vulcanization of the unvulcanized silicone rubber into a rubbery elastomer. The improved method of manufacturing the covering member according to the invention excludes the necessity of metal molds prepared each time accomodating to the respective patterns of the contact point arrangement naturally accompanied with saving of the cost for the metal molds. The invention further provides another advantage of obtaining the covering members of keyboard at low costs owing to the decrease of the expense for the work of wetting up by carrying out the step of fixing the push button elements to the base plate using a silicone-based rubbery adhesive or a pressure-sensitive adhesive. The invention further provides a method of manufacturing covering members of keyboard accomodative to the instant needs of small-scale production of different models owing to the introduction of the process of punching the base plate instead of integral molding.

The push button elements constructing the covering member of keyboard in the invention require no alteration in the shapes, materials and color tones thereof from conventional ones. Accordingly, they may be selected from any of varieties including an elastomeric body having an elastic rubber rod in a shape of a bottom-upward cup as the frictionally sliding elements and those combined with a metallic plate element in order to give a function of resilience to the push buttons varied in size, stroke, permissible maximum load, appearance and the like. Selection and combination of different types of push button elements are not particularly limitative. The material for the elastic push button elements is selected from natural rubber, diene-based and other synthetic rubbers including polyester-based synthetic rubbers and silicone-based synthetic rubbers as well as combinations thereof with preference to silicone rubbers in consideration of the heat resistance, weatherability and electrical insulation. On the other hand, the metallic plates for the resilience function of the push button elements are selected from belleville springs in the form of a bottom-upward cup prepared by pressing a plate of a metal such as stainless steel, phosphor bronze or beryllium-copper optionally with plating of gold or silver. Application of a suitable primer to the jointing surfaces may be made optionally in order to increase the bonding strength to the layers of the silicone rubber-based adhesive or pressure-sensitive adhesive.

The push button elements may be formed as a whole either of an insulating material or an electrically conductive material with preference to a combination of an electrically conductive material for the contact points and an insulating material for the dome-like portion. The push button elements are prepared by the method of multiple molding according to a conventional method such as compression molding, injection molding, transfer molding and the like.

The base plate constructing the covering member of keyboard has openings for arranging the above described push button elements formed by punching and they are made of a plastic such as polyester, polycarbonate, polyacrylate, polyarylate, polyimide, silicone rubber and the like, rubber and metallic plate or foil. Laminate materials prepared by combining these materials can also be used. The size of the base plate should be determined freely according to the object of use of the keyboard. The thickness of the base plates is preferably in the range from 10 to 2000 μm or, more preferably, from 75 to 30 μm since a base plates having a thickness smaller than 10 μm would cause some inconvenience in transportation because of the extremely small thickness and the base plates having a thickness exceeding 2000 μm would increase the material cost and the difficulty in the punching work. The work to form openings is carried out, for example, by punching, laser cutting, blade cutting and the like. The number, size and arrangement of the openings should be determined in consideration of the intended use of the covering member of keyboard, the conditions of use, contraction after assembling of the molded articles and the like. The contour of the base plate should be made in the form of the covering members of the keyboard by trimming using a punching die or a laser simultaneously with or after the above mentioned punching works.

The base plate should usually be electrically insulating but, in an alternative embodiment of the invention, it should preferably be electrically conductive or semiconductive in order to obtain the effects of reduction of charging of static electricity, prevention of difficult problems due to static electricity and electromagnetic shielding. The method of imparting the base plate with electric conductivity or semi-conductivity is not particularly limitative and may be any of known methods including use of a composite material prepared by compounding a conductive material such as carbon black, carbon fibers, metal particles, metal fibers and the like with an insulating plastic or rubber, use of a metal plate for the whole base plate and use of a substrate of an insulating material coated with a conductive coating composition, vacuum-deposited metal layer or metal plating layer or laminated with a sheet of a conductive material.

The covering member of keyboard of the invention is finished up by arranging the above-mentioned push button elements in the openings of the base plates formed by punching or by other suitable means and fixing each element to the peripheral zone of the opening using silicone rubber or a tacky adheasive. In the case of using silicone rubber, the push button elements are temporarily fixed using an unvulcanized silicone rubber with the aid of stickiness of the material per se and then the silicone rubber is vulcanized by heating, by pressing with heating or by bringing the rubber to a moisture-containing atmosphere to cause moisture-induced crosslinking reaction as as to cure the silicone rubber.

Figure 2:
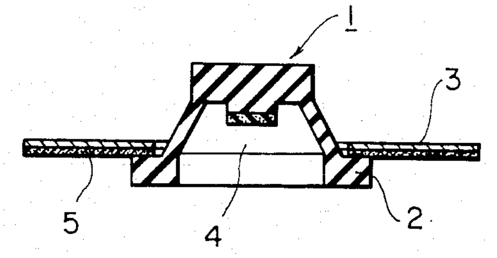
FIG. 2 is a longitudianl cross-section of an essential part of another model of the covering member of the invention in which the base part of the push button covering member is fixed to the lower surface of the base plate.

The diameter of the openings in the base plate should be adequately selected in accordance with the manner of fixing the push button elements. For example, the openings should have a diameter in the range from the diameter of the movable contact point as the minimum and the inner diameter of the dome-like portion as the maximum in the case of laying the push button elements on the top surface of the base plate as shown in FIG. 1. When the push button elements is inserted from the side of the bottom surface as shown in FIG. 2, the diameter of the openings should be preferably by 0.05 to 5.0 mm or, more preferably, 0.2 to 2.0 mm larger than the outer diameter of the base of the push button elements in order to avoid the troubles of forming fine gaps at the periphery of the opening during the punching works or the possibility of having the push button elements in contact with the dome-like portion. The outer diameter of the base edge of the push button elements should preferably be by 0.4 to 10.0 mm or, more preferably, by 2.0 to 4.0 mm larger than the diameter of the openings in order to secure a sufficiently large area availabnle for adhesion between the base of the push button element and the base plate.

The silicone rubber used for fixing the push button elements is selected from those curable by the mechanism of the free-radical reaction, condensation reaction and addition reaction without particular limitations. A so-called silane coupling agent or a titanate coupling agent may optionally be used with an object of increasing the bonding strength by incorporating into the silicone rubber by kneading. The silicone rubbers of the addition reaction- curable type compounded of a diorganopolysiloxane and an organohydro-genpolysiloxane admixed with a platinum catalyst are the most preferable because of the possibility of vulcanization by heating in a short time and the high adhesiveness in the uncured stage. The use of such a silicone rubber composition provides several advantages such as increase in the positional precision in the temporary fixing of the push button elements to the base plates, disappearance of stickiness after vulcanization and easiness in transportation.

The preferred pressure-sensitives adhesive used for fixing the push button elements are those having a high bonding strength in the initial stage and are selected from rubbery materials including natural rubber, SBR, reclaimed rubbers, polyisobutylene and the like, acrylic polymers including copolymers prepared from an acrylic ester as the principal component having 1 to 12 carbon atoms in an alkyl group thereof, acrylic acid, methacrylic acid, acrylamide, vinyl acetate, styrene and the like, silicone-based polymers comprising a silicone rubber and a silicone resin obtained by condensaation reaction of a hydrolyzate of organochlorosilanes and others. These pressure-sensitive adhesives are used without limitation including the vulcanizable ones and classified into organic-solution type, aqueous emulsion type, hot-melt type and aqueous solution type according to the formulation thereof. In practicing the invention, the pressure-sensitive adhesive is selected in consideration of the nature of the materials of both the push button elements and the base plate. The pressure-sensitive adhesive may also be in the form of a hot-melt type adhesive shaped in a sheet or in the form of a multilayered laminate such as a film adhesive comprising a substrate and an adhesive material or materials of the same or different types applied to one or both sides of the substrate.

In the covering members of keyboard of the invention, fixing of the push button elements to the punched base plates is carried out by applying a pressure-sensitive adhesive or by adhesive bonding with a vulcanizable silicone rubber in addition to temporary fixing by the mere stickiness so that the positional dragging would not be caused at all in the durability test against repeated strokes and the covering member of keyboard according to the invention do not differ from the products by the conventional methods including integral molding. Priming treatment of the push button elements and the base plates may optionally be carried out beforehand by using a suitable primer composition such as silane coupling agents, titanate coupling agents and the like.

Application of ta silicone rubber or a pressure-sensitive adhesive to the push button elements and the base plates is carried out prior to or after the punching process by the method of casting, topping, printing and the like to the whole surface area of the base plate or limitedly to the peripheral zones of the openings and the base of each push button element facing the base plate. The punching work of the base plate may also be carried out optionally after lamination of a covering film. The thickness of the applied layer of the silicone rubber or the pressure-sensitive adhesive is preferably in the range from 0.005 to 2 mm or, more preferably, from 0.04 to 0.3 mm in most cases which is the most effective to obtain from fixing. In the use of a pressure-sensitive adhesive, the sticky surface where the adhesive is exposed after fixing of the push button elements should preferably be masked in order to prevent deposition of dusts by providing a layer of a covering film such as films of a plastic such as polyester, polypropylene, polyethylene and the like, a sheet of fine paper, kraft paper or release paper, powdery materials, cellulosic bead materials, non-sticky coating materials and the like.

In the following, the covering member of keyboard of the invention prepared by directly fixing the push button elements to the openings of a base plate using a silicone rubber or a pressure-sensitive adhesive is explained with reference to the accompanying drawing. FIGS. 1 to 4 are each a longitudinal cross section of the essential part of a covering member of keyboard in a preferred embodiment of the invention. The base 2 of the push button element 1 is fixed by adhesion to the top surface of the peripheral zone of the opening 4 of the base plate 3 by means of a layer 5 of a silicone rubber or a pressure-sensitive adhesive in FIG. 1. The base 2 of the push button element 1 is fixed by adhesion to the lower surface of the peripheral zone of the opening 4 of the base plate 3 by means of the layer 5 of a silicone rubber or a pressure-sensitive adhesive in FIG. 2. The base 2 of the push button element 1 is fixed by adhesion to the side wall surface of the opening 4 of the base plate 3 by means of the layers 5 of a silicone rubber or a pressure-sensitive adhesive in FIG. 3. The base 2 with fitting cavities or fitting grooves of the push button element 1 is fixed to the peripheral zone of the opening 4 of the base plate 3 by means of a layer 5 of a silicone rubber or a pressure-sensitive adhesive in parallel with the aid of tailing of the protrusions 6 formed on the top surface of the peripheral zone of the opening 4 into the above mentioned cavities or grooves in FIG. 4. Several advantages are obtained in the fixing manner shown in FIG. 2 in which the trouble of dust deposition is avoided due to the elimination of the difference in the level at the portions of bonding and the change of the stroke derived from the thicknesse of the base plate and the layer of the silicone rubber or the pressure-sensitive adhesive inducing the possibility of diversion of the push button elements used in the covering members of the keyboard in the prior art. The covering member of keyboard thus prepared according to the invention has a characteristic feature that the use of a single or a plural number of the types of push button elements is sufficient for the needs differently form prior art method of manufacturing covering members of keyboard in which integral molding of the push button elements is involved and use of a specifically designed metal mold is required for each type of the covering members of keyboard.

In another preferred embodiment of the invention, the push button elements are fixed by adhesion using an adhesive or a pressure-sensitive adhesive to the base plate having openings conforming to the pattern of the button arrangement indirectly with intervention of at least one of the unit bodies each carrying one or a plural number of push button elements providing an advantage of saving the work time for setting up of the push button elements when a large number of push button elements are to be installed.

Figure 7:
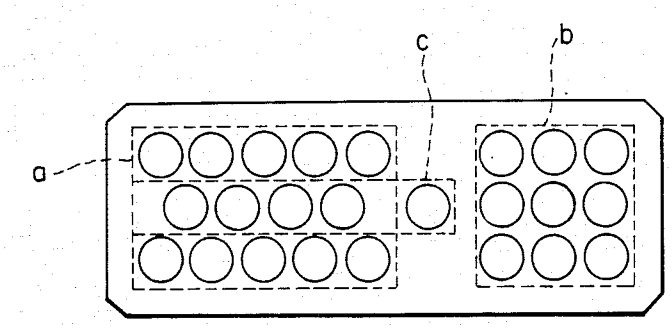
FIG. 7 is a plan view of a base plate carrying a plural number of divided unit bodies of push button elements for a covering member of keyboard.
Figure 8:
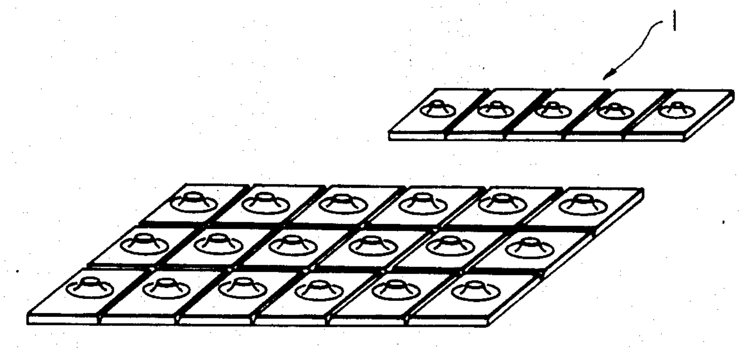
FIG. 8 is a perspective view of blocks of push button elements for a covering member of the same keyboard as that shown in FIG. 7.
Figure 9A:
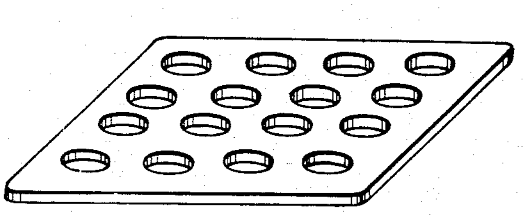
FIG. 9 is a perspective view of a base plate having openings used in a covering member of keyboard.
Figure 9B:
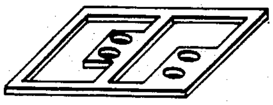

In the above mentioned improved and preferred embodiment of the invention, at least one of the unit bodies each carrying a plural number of the push button elements is used instead of using a number of the push button elements separately. The unit bodies are prepared, for example, by cutting out in a desired pattern from a push button block formed by setting up a plural number of the push button elements to a rubber sheet as shown in FIG. 8. FIG. 7 is showing a combination of three types of unit bodies which includes unit bodies a carrying 4 or 5 push button elements arranged latarally in series, the unit body b carrying 9 push button elements arranged in a three rows by three columns arrangement and the unit body c carrying a single push button element. Each of the push button elements should preferably be surrounded by thinned dividing lines in order to be easily divided into several units each carrying an appropriate number of the push button elements as shown in FIG. 8.

The covering member of the improved and preferred embodiment of the invention is prepared by fixing at least one of the unit bodies each carrying the push button elements arranged in the openings of the base plate using an adhesive or a pressure-sensitive adhesive with optional application of a primer to the jointing surfaces of the push button elements with an object of increasing the bonding strength to the unit body.

The pressure-sensitive adhesives used for fixing the unit bodies of the push button elements to the base plate are selected from those described previously. The adhesives used with the object as above are selected from the adhesives of the types of heat-setting plastics such as urea-formaldehyde resins, phenol-formaldehyde resins, resorcin-formaldehyde resins, epoxy resins and silicone rubbers, the adhesives of the types of thermoplastic resins such as polyvinyl acetate, polyvinyl alcohol, various kinds of polymers obtained from acrylic esters or methacrylic esters, polyamides, polyesters, polyamideimides, polybenzimdazoles and polyimides and the polymeric adhesives of the composite types such as composites of polyvinyl acetal and phenol-formaldehyde resin, rubber and phenol-formaldehyde resin, epoxy resin and nylon and the like without particular limitation. The use of a coupling agent is also optional as described before. Furthermore, the use of the three-layered laminate composed of those selected from the above described ones and an intervening layer such as a film adhesive may also be suitable. The use of a pressure-sensitive adhesive gives a possibility of replacement of the push button elements and the use of an adhesive provides advantages of a higher bonding strength as compared with the use of a pressure-sensitive adhesive in the absence of positional drag, high durability and disappearance of the surface tackiness after vulcanization to be freed from the trouble by the deposition of dust. The method for the application of the adhesive or pressure-sensitive adhesive and the preferred thickness of the layer thereof are the same also as described before. In the use of a non-vulcanizable pressure-sensitive adhesives, backing should preferably be carried out using a plastic film or a sheet of release paper in order to avoid deposition of dust on the parts other than the unit bodies carrying the push button elements due to the lasting stickiness.

Figure 10:
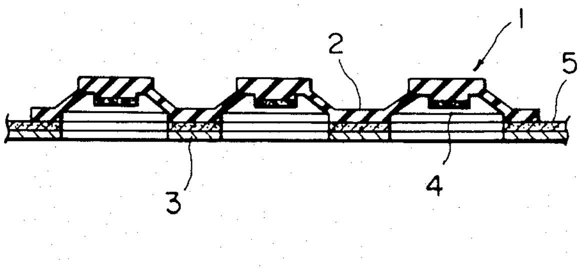
FIG. 10 is a longitudinal cross-section of an essential part of a covering member of keyboard in which the unit body has push button elements fixed to the top surface of a base plate.
Figure 11:
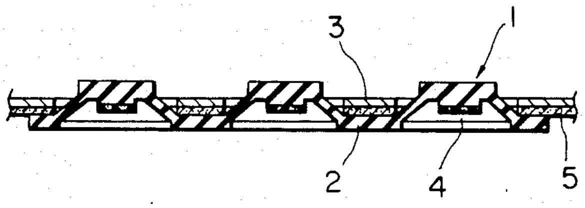
FIG. 11 is a longitudinal cross-section of an essential part of a covering member of keyboard in which a unit body has push button elements fixed to the lower surface of a base plate.
Figure 12:
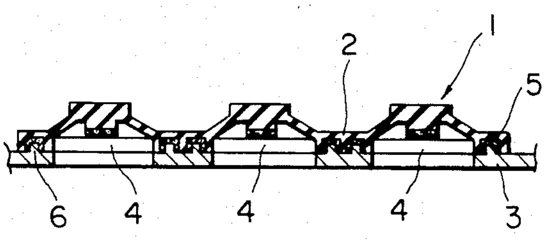
FIG. 12 is a longitudinal cross-section of an essential part of a covering member of a keyboard in which a unit body has push button elements fixed to a base plate with an aid of tailing of protrusions into cavities.
Figure 13A:
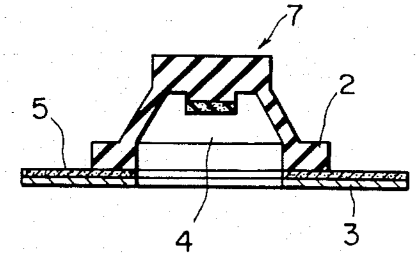
FIGS. 13*a* and 13*b* are each a longitudinal cross-section of the essential part of the covering member of keyboard shown in FIGS. 10 and 11, respectively.
Figure 13B:
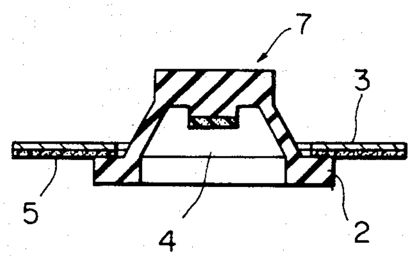

In the following, the covering member of keyboard in the improved and preferred embodiment of the invention is described with reference to the accompanying drawing. FIGS. 10, 11 and 12 each illustrate the essential part of a longitudinal cross section of the covering member of keyboard in an improved and preferred embodiment of the invention. The base 2 of each push button element 1 is fixed to the top surface of the peripheral zone of the opening 4 of the base plate 3 by bonding using a pressure-sensitive adhesive in FIG. 10. The base 2 of each push button element 1 is fixed to the lower surface of the peripheral zone of the opening 4 of the base plate 3 by bonding using a pressure-sensitive adhesive in FIG. 11. The base 2 of each push button element 1 having fitting cavities is fixed to the peripheral zone of the opening 4 of the base plate 3 by bonding using a pressure-sensitive adhesive along with the aid of tailing of the protrusion formed on the peripheral zone of the opening to the above fitting cavities in FIG. 12. The advantages obtained in the fixing manner shown in FIG. 11 are the same as those in the embodiment previously shown in FIG. 2. The covering member of keyboard in the improved and preferred embodiment of the invention is prepared by setting up of the unit bodies jointly carrying the push button elements to the base plate forming the input part of the keyboard.

The novel and improved base plate for the covering member of keyboard is also inventive in that the positional matching of the punched button elements may be carried out easily and accurately. The base plate of the invention has a characteristic of having openings for setting up of the push button elements conforming to the arrangement pattern of the fixed contact points on a printed circuit board prepared by laying the fixed contact points and the requisite circuit wiring.

The inventors have discovered a fact that magnifying and intricateness of the molding shrinkage and expansion or contraction during use are derived from the presence of thick-walled or protruded portions like the push button elements as a result of their extensive studies on the manufacturing method of covering members of keyboard at low costs and applicable to small-scale production of a number of different models. The inventors also have discovered another fact that the problems of difficulties due to molding shrinkage and expansion or contraction during use and the troublesomeness in the positional matching are easily solved by using an assembly base plate having openings for setting up of the push button elements confronting the arrangement of the fixed contact points on the printed circuit board prepared by laying electrode contact elements and circuit wiring. The step of integral molding can easily be omitted by the substitution of separate bonding of the individual push button elements each with a desired shape to the base plate using an adhesive or a pressure-sensitive adhesive. Accordingly, covering members of keyboard arranged in a desired pattern can be manufactured at low costs by introducing the punching process of the base plates.

In the following, the base plates for the covering members of keyboard of the invention to set up the push button elements are described with reference to the accompanying drawing.

Figure 17A:
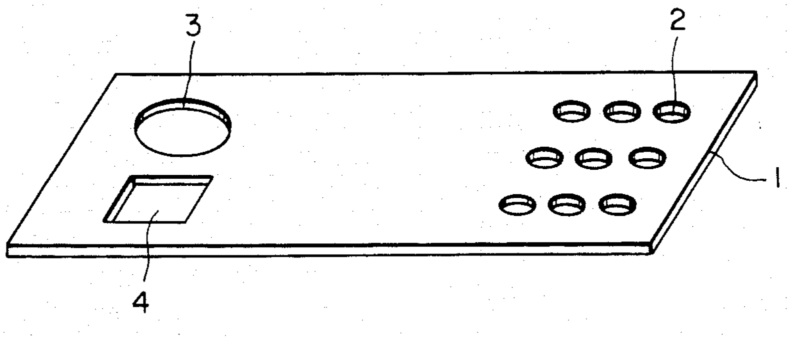
FIGS. 17*a* and 17*b* are each a perspective view of a base plate for a covering member of keyboard with openings different in shapes and sizes and two different push button elements to be set up to the openings of the base plate, respectively.
Figure 17B:
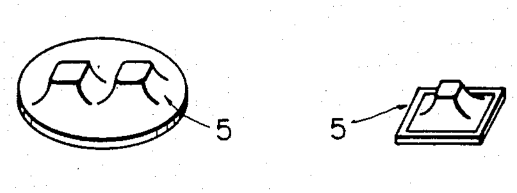

FIG. 17*a* shows a perspective view of a base plate and FIG. 17*b* shows perspective views of two different types of push button elements to be set up to the base plate. The base plate shown in FIG. 17*a* is made, for example, of a silicone rubber in the form of a rectangular plate 1 having nine openings 2 arranged in a three rows by three columns arrangement in the right-hand part thereof, a large circular opening 3 in the left-hand part thereof and a square opening 4 also in the left-hand part thereof. These openings 2, 3 and 4 are in an arrangement each to confront one of the fixed contact points (not shown in the figure) on the printed circuit board on which the covering member is to be mounted. A covering member of keyboard is made by fixing standard push button elements prepared separately by molding to be imparted with controlled quality such as the molding shrinkage, stroke, color and the like to the peripheral zones of the openings 2, 3 and 4 by means of any appropriate means such as an adhesive or pressure-sensitive adhesive. The base plate of the invention may be formed using boring tools such as a cutter blade, punching die and the like simultaneously with trimming work to form the outward shape of the rectangular plate 1 instead of separate boring for the openings confronting one or a plural number of the fixed contact points in groups on the printed circuit board in conformity with the shapes, sizes and positions.

Figure 18:
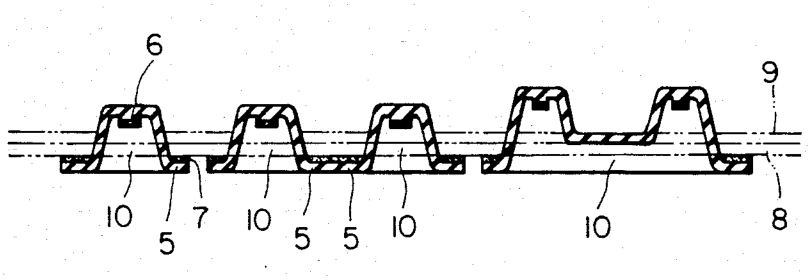
FIG. 18 is a longitudianl cross-section of an essential part of a covering member of keyboard composed of a base plate and a plural number of push button elements fixed to the base plate.

FIG. 18 is a cross-sectional view of a covering member of keyboard prepared using an assembly base plate of the invention. A plural number of the push button elements 5 each carrying a movable contact point 6 are fixed to the peripheral zones of the openings 10 of the assembly base plate 1 having a structure of laminate including a plastic sheet 8 such as a sheet of polyetnylene terephthalate and an aluminum foil 9 as the electromagnetic insulating (EMI) shield by means of the adhesive layer 7.

The base board for setting up of the push button elements is separately prepared from the push button elements in the finished covering member of keyboard as is readily understood from the above given description. The degrees of molding shrinkage and contraction during use can readily be estimated beforehand because of the planar form thereof. The openings confront the arrangement pattern of the fixed contact points on the circuit board to which the covering member is fitted and the push button elements arranged in the openings are immune from contraction because of the previous contraction so that covering members of keyboard with a desired arrangement pattern of push button elements are obtained easily and at low costs without further consideration of the molding shrinkage and contraction during use.

As is clear in view of the above description, the covering member of keyboard and the base plate for the covering member have various advantages in the industrial practice such as the possibility of economical small-scale production of several different models, decrease in the delivery term, increase in the production efficiency and so on.

In the following, the invention is described in more detail by way of examples, in which the term "parts" always refers to "parts by weight".

Preliminary Preparation 1 (Preparation of push button elements).

Elements of electrically conductive contact points were prepared by compression molding, under a pressure of 50 kg/cm$^2$ at 170° C., of an electrically conductive rubber compound with a formulation of 70 parts of a silicone rubber compound (KE 742U, a product by Shin-Etsu Chemical Co.), 30 parts of acetylene black and 0.5 part of dicumyl perioxide. The elements of conductive contact points were mounted on the respective proper spots of a metal mold for push button elements corresponding to movable contact points followed by feed of an insulating rubber compound prepared with a formulation of 100 parts of a silicone rubber compound (KE 951U, a product by Shin-Etsu Chemical Co.), 1.5 parts of dicumyl peroxide and 0.5 part of a white pigment. Precursors for the push button elements composed of the conductive contact points and the insulating rubber in an integrated form were then prepared by compressionmolding by vulcanizing an insulating rubber compound at 170° C. under a pressure of 50 kg/cm$^2$. Each of the precursors carried 48 push button elements each having an outer diameter of 9.5 mm and inner diameter of 8.7 mm of the dome, height of the dome of 3.3 mm and thickness of the dome wall of 0.8 mm, with thinned dividing lines therearound formed in parallel with intervals of 13 mm in the down direction and 15 mm in the across direction. Elements in the form of a 13 mm by 15 mm rectangle each carrying a single push button were obtained by dividing 20 of the precursors prepared by multiple molding along the thinned dividing lines.

Preliminary Preparation 2.

A metal mold was charged with an insulating rubber compound prepared with a formulation of 100 parts of ethylene-propylene copolymeric rubber (EPDM 501A a product by Sumitomo Chemical Industries Co.), 40 parts of calcium carbonate, 3 parts of dicumyl peroxide, 1 part of a vulcanization accelerator, 0.5 part of a red colorant and 40 parts of a paraffin-based softening agent. By multiple molding with simultaneous vulcanization of the compound at 170° C. under a pressure of 50 kg/cm$^2$, 480 push button elements in a single joint form were prepared in the same manner as in Preliminary Prepartion 1 followed by dividing into 13 mm by 15 mm rectangles.

Preliminary Preparation 3.

By multiple molding of a compound prepared with the same formulation as in Preliminary Preparation 1 except that the color of the colorant was black under the same molding condition, 260 push button elements were prepared in 10 sheets each containing 26 in an integral form of the conductive contact points and the insulating rubber sheet. Each push button member had an outer diameter of 14.4 mm, inner diameter of 10.0 mm, inner diameter at the dome of 13.4 mm, height of 6 mm and wall thickness of 0.8 mm. The integral sheets of the push button members were divided into circles each having a diameter of 18.4 mm.

Preliminary Preparation 4.

By carrying out multiple molding of a compound in a similar manner to Preliminary Preparation 3 except that the color of the colorant in the compound was blue, 770 push button elements in 10 sheets each containing 77 were prepared. Each push button member had an outer diameter of 8.0 mm, inner diameter of 5.0 mm, inner diameter at the dome of 7.4 mm, height of 3.0 mm and wall thickness of 0.7 mm. The integral sheets of the push button elements were divided into rectangles each having dimensions of 10 mm by 12 mm.

Preliminary Preparation 5.

By carrying out multiple molding in a similar manner to Preliminary Preparation 1, 10 integral sheets of push button elements were prepared each carrying 480 elements surrounded by thinned dividing lines running in parallel at distances of 13 mm in both across and down directions.

Preliminary Preparation 6.

By carrying out multiple molding in the same manner as in Preliminary Preparation 1 except that the color of the colorant in the rubber compound was blue, 11 sheets were prepared each carrying 770 push button elements arranged at uniform pitches of 10 mm in the across direction and 12 mm in the down direction. Each of the push button elements had an outer diameter of 8.0 mm, inner diameter of 5.0 mm, inner diameter of the dome of 7.4 mm, height of the dome of 3.0 mm and wall thickness of the dome of 0.7 mm.

Preliminary Preparation 7.

By carrying out multiple molding in the same manner as in Preliminary Preparation 2, 10 sheets were prepared each carrying 260 push button elements arranged at unirform pitches of 19.0 mm in both across and down directions. Each of the push button elements had an outer diameter of 14.4 mm, inner diameter of 10.0 mm, inner diameter of the dome of 13.4 mm, height of the dome of 6.0 mm and wall thickness of the dome of 0.8 mm.

Example 1

A vulcanized insulating silicone rubber sheet having dimensions of 250×50×0.6 mm was treated by topping with a low-temperature vulcanizable silicone rubber compopund (KE 167, a product by Shin-Etsu Chemical Co.) to form a coating layer of the silicone rubber having a thickness of 0.1 mm by rolling and then laminated with a polypropylene film having a thickness of 0.025 mm as a covering film. A base plate having dimensions of 60×80 mm of the external size was worked to form 12 openings each having a diameter of 11.5 mm in a three rows by four columns arrangement at a uniform pitch of 16.0 mm using a cutter blade followed by peeling off of the polypropylene film.

Then, 6 push button elements obtained in Preliminary Preparation 1 and 6 more push button elements obtained in Preliminary Preparation 2 were coated with a primer (Primer No. 4, a product by Shin-Etsu Chemical Co.) at the surface of the base facing the base plate followed by drying and were arranged by inserting from the lower side of the base plate as shown in FIG. 2. Vulcanization of the silicone rubber was carried out by heating for 30 minutes at 160° C. in an oven to give a covering member of keyboard carrying push button elements firmly bonded by adhesion to the base plate. The covering member of keyboard passed the test of 10,000,000 times of strokes.

Example 2

A polyester sheet having dimensions of 300×300×0.2 mm was coated with the same primer as used in Example 1 followed by drying and then adhesively bonded to a silicone rubber film having a thickness of 0.02 mm coated with the primer on the surface. Then, the laminate having dimensions of 60×230 mm was punched using female and male punching dies to form 30 openings each having a diameter of 16.0 mm in a three rows by 10 columns arrangement. A layer of the same unvulcanized silicone rubber as above was provided on the surface around the periphery of each opening.

In the next place, 30 push button elements obtained in Preliminary Preparation 3 were temporarily bonded to the peripheral zones of the openings with the aid of the unvulcanized silicone rubber applied thereto and vulcanization of the silicone rubber was carried out by heating for 60 minutes at 100° C. in an oven to give a covering member of keyboard in which the push button elements were firmly bonded to the base plate. The covering mem-ber thus obtained passed the test of 10,000,000 times of strokes and was excellently antistatic.

Example 3

A sheet of polycarbonate resin having dimensions of 300×300×0.2 mm was coated on the top surface with the same primer as used in Example 1 followed by drying and then subjected to a punching work in the same manner as in Example 1 to form 15 openings each having a diameter of 9.0 mm in a pattern of a three rows by 5 columns arrangement at a pitch of 13 mm in the upper part thereof on one hand and 20 openings each having a diameter of 10.5 mm in a four rows by five columns arrangement at a pitch of 15.0 mm in the lower part thereof on the other hand. A layer of silicone rubber having a thickness of 0.03 mm was formed by screen printing on each of the peripheral zones of the openings using a self-adhesive silicone rubber composition curable by the addition reaction (KE 1800ABC, a product by Shin-Etsu Chemical Co.) admixed with a platinum catalyst.

In the next place, 15 push button elements obtained in Preliminary Preparation 4 were arranged in the openings in the upper part of the polycarbonate base plate and 20 more push button elements obtained in Preliminary Preparation 1 were arranged in the openings in the lower part of the same. Vulcanization of the silicone rubber was carried out by heating for 60 minutes at 100° C. in an oven to obtain a covering member of a keyboard carrying two different kinds of push button elements firmly bonded to the base plate. The covering member passed the test of 10,000,000 times of strokes.

Example 4

A polyester sheet having dimensions of 100×100×0.15 mm was coated with a silicone-based pressure-sensitive adhesive (KR-101-10, a product by Shin-Etsu Chemical Co.) in a thickness of 0.10 mm by casting and laminated with a polypropylene film. Thereafter, the laminate was punched to form 16 openings each having a diameter of 11.5 mm arranged in a four rows by four columns arrangement at a pitch of 15.5 mm followed by peeling off of the polypropylene film.

In the bext place, the base of each of 16 push button elements obtained in Preliminary Preparation 1 was inserted into one of the openings in the punched polyester sheet to be fixed by the stickiness of the adhesive in a manner shown in FIG. 2 to give a covering member of keyboard. The push button switches passed the test of 1,000,000 times of strokes.

Example 5

A polyester sheet having dimensions of 100×100×0.15 mm was coated with an acrylate-based pressure-sensitive adhesive (DA-672, a product by Nogawa Chemicals Co.) in a thickness of 0.07 mm by casting and laminated with a polypropylene film.

Thereafter, the laminate was punched to form 16 openings each having a diameter of 11.5 mm in an arrangement of four rows and four columns at a pithc of 15.5 mm using a punching die followed by peeling off of the polypropylene film.

In the next place, the base of each of the 16 push button switch elements obtained in Preliminary Preparation 2 was inserted into one of the openings of the punched polyester sheet and fixed to the sheet by the stickiness of the adhesive in a manner shown in FIG. 2. The covering member of keyboard thus obtained passed the test of 1,000,000 times of strokes.

Example 6

A polyester sheet having dimensions of 120×350×0.1 mm was laminated with a pre-shaped film of an acrylate-based pressure-sensitive adhesive (5302, a product by Nitto Denko Co.), an intermediate supporting film and a silicone adhesive with the layer of the acrylate adhesive facing the polyester sheet. Thereafter, the laminate having outer dimensions of 100×320 mm was punched to form 60 openings each having a diameter of 16.0 mm arranged in a four rows by 15 columns arrangement at a pitch of 19.5 mm using a punching die.

Figure 3:
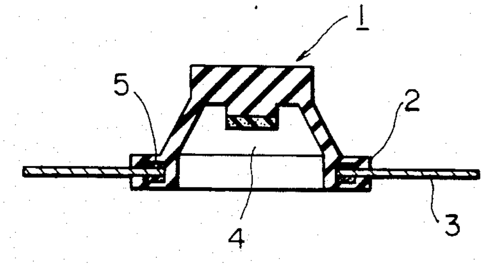
FIG. 3 is a longitudinal cross-section of an essential part of still another model of the covering member of the invention in which base part of the push button covering member is fixed to the side surface of the edge of an opening.
Figure 4:
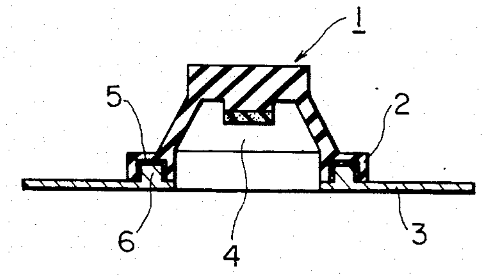
FIG. 4 is a longitudinal cross-section of an essential part of a further different model of the covering member of the invention in which the base of the push button covering member is fixed to a base plate with the aid of tailing of a protrusion of the base plate into a cavity of the base of the push button element.
Figure 5:
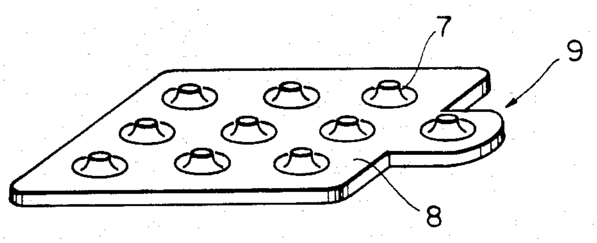
FIG. 5 is a perspective view of a covering member of a keyboard in the prior art.
Figure 6:
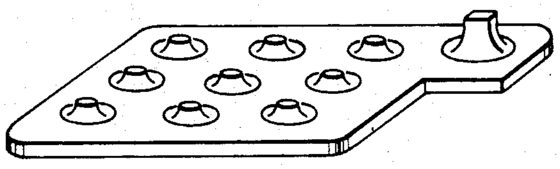
FIG. 6 is a perspective view showing another model of a covering member of keyboard in the prior art having a push button element different in size from the other push button elements.

In the next place, 60 push button switch elements obtained in Preliminary Preparation 3 were arranged by inserting into the openings of the punched polyester sheet and fixed to the sheet by utilizing the stickiness of the adhesive in a manner shown in FIG. 3. The covering member of keyboard thus obtained passed the test of 1,000,000 times of strokes.

Example 7

A polycarbonate sheet having dimensions of 120×80×0.1 mm was coated with the same silicone-based adhesive as used in Example 3 in a thickness of 0.08 mm by casting and laminated with a polypropylene film. Thereafter, the laminate was punched to form 20 openings each having a diameter of 9.0 mm in a four rows by five columns arrangement at a pitch of 15.0 mm using a punching die followed by peeling off of the polypropylene film.

In the next place, 20 push button switch elements obtained in Preliminary Preparation 4 were inserted into the openings of the punched polycarbonate sheet and fixed by utilizing the stickiness of the adhesive followed by lamination of a covering film onto the exposed sticky surface to obtain a covering member of keyboard which passed the test of 1,000,000 times of strokes.

Example 8

The blocks of the push button elements prepared in Preliminary Preparation 5 were divided along the thinned dividing lines into 11 unit boards as shown in the following table.

| Lot No. | Method of Dividing (pieces) | Number of Sheets | No. of Unit Board |
|---|---|---|---|
| 1 | 5 × 4 | 1 | A |
| 2 | 2 × 3 | 1 | B |
| 3 | 1 × 12 | 4 | C |
| 4 | 1 × 3 | 1 | D |
| 5 | 1 | 4 | E |

Figure 14:
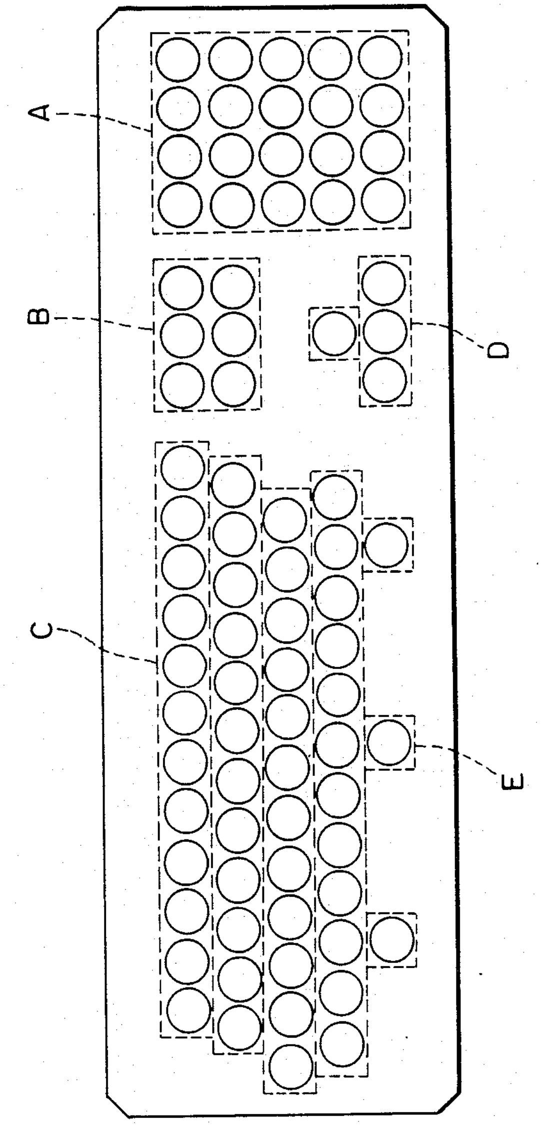
FIG. 14 is a top view of a covering member of a keyboard having a plural number of unit bodies of push button elements.

Thereafter, a polyester sheet having dimensions of 500×500×0.1 mm coated with the same primer as used in Example 2 and dried was subjected to topping with the same low-temperature vulcanizable silicone rubber as used in Example 1 containing a platinum catalyst to form a coating layer of the silicone rubber having a thickness of 0.1 mm by rolling followed by lamination with a polypropylene film having a thickness of 0.025 mm as the covering film. The laminate was punched to give outer dimensions of 130×430 mm and openings each having a diameter of 10.5 mm arranged in a pattern shown in FIG. 14 at a pitch of 13.0 mm using a cutter blade followed by peeling off of the polypropylene film to give a base plate of a covering member of keyboard.

In the next place, the unit bodies of the push button elements obtained in the above were arranged by inserting into the corresponding spots of the base plate followed by heating for 60 minutes at 100° C. in an oven to vulcanize the silicone rubber so that a covering member of keyboard was obtained carrying the unit bodies of the push button elements firmly bonded to the base plate. The covering member passed the test of 10,000,000 times of strokes. The working time required for setting up of the unit bodies was only 40 seconds.

Example 9

Following unit bodies were prepared by dividing the blocks of the push button elements obtained in Preliminary Preparations 5, 6 and 7 along the dividing lines.

Figure 15:
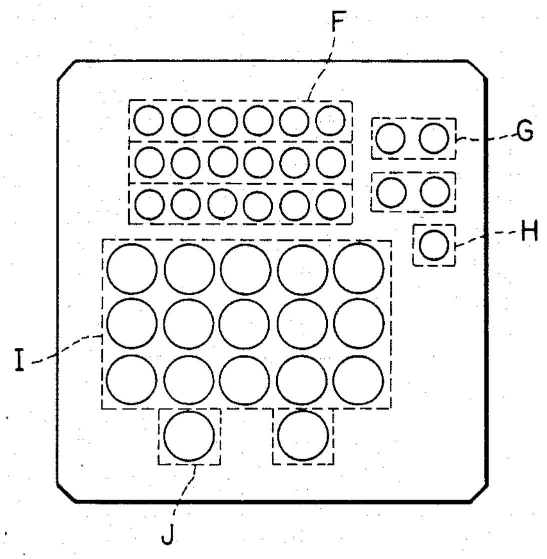
FIG. 15 is a plan view of a base plate of a covering member of keyboard having a plural number of irregularly arranged openings different in shapes and sizes.

Separately, a polyester sheet having dimensions of 180×180×0.125 mm was punched to form openings arranged in a pattern suitable for a keyboard as shown in FIG. 15 and coated with the same self-adhesive silicone rubber composition as used in Example 2 containing a platinum catalyst on the peripheral zones of the openings by screen printing to form a layer having a thickness of 0.03 mm.

| Lot No. | Preliminary Preparation | Method of Dividing (pieces) | Number of Sheets | No. of Unit Boards |
|---|---|---|---|---|
| 6 | 7 | 3 × 5 | 1 | I |
| 7 | 7 | 1 | 2 | J |
| 8 | 5 | 1 × 2 | 2 | G |
| 9 | 5 | 1 | 1 | H |
| 10 | 6 | 1 × 6 | 3 | F |

In the next place, the unit bodies of the push button elements obtained in the above were arranged by inserting into the openings in the lower part of the base plate followed by heating for 30 minutes at 150° C. in an oven to vulcanize the silicone rubber. The covering member of keyboard thus obtained carrying unit bodies of the push button elements firmly adhering to the base plate passed the test of 10,000,000 times of strokes.

The working time required for setting up of the unit bodies was only 25 seconds.

Example 10

A preparation work was carried out in a similar manner to Example 8 to obtain 11 unit bodies of the push button elements.

Figure 16:
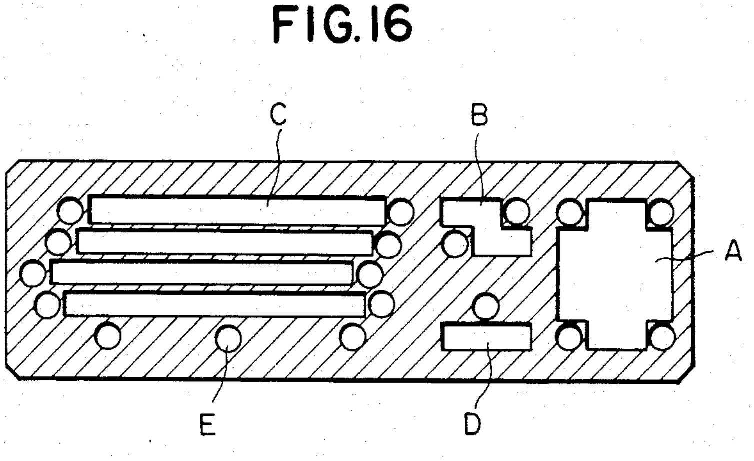
FIG. 16 is a plan view of a base plate of a covering member of keyboard having irregularly shaped and arranged openings to which unit bodies of push button elements are to be fixed.

Separately, a polyester sheet having dimensions of 500×500×0.1 mm was laminated with the same preshaped film of a pressure-sensitive adhesive as used in Example 7 in the same manner and punched to form openings in varied shapes and sizes as shown in FIG. 16 by the symbols A, B, C, D and E. The unit bodies of the push button elements obtained in this manner were arranged by inserting into the corresponding spots of the base plate in a manner shown in FIG. 11.

In order to avoid deposition of dust on to the portions of the exposed sticky adhesive shown by hatching in FIG. 16, patterned masks of a plastic film or a sheet of release paper with cut-out portions confronting the push button unit bodies were overlaid after positioning. The covering member of keyboard thus obtained passed the test of 1,000,000 times of strokes.

The working time required for setting up of the unit bodies to the base plate was only 38 seconds.

Comparative Exmaple 1

The block of the push button elements obtained in Preliminary Preparation 5 was divided into 81 pieces of single push button elements having dimensions of 13 mm×13 mm. These push button elements were arranged by inserting individually into the predetermined spots shown in FIG. 14 in the punched base plate similarly processed to Example 8 with a silicone rubber by topping from the side of the lower surface in a manner shown in FIG. 11. Heating was carried out for 60 minutes at 100° C. in an oven to vulcanize the silicone rubber so that a covering member of keyboard was obtained carrying push button elements adhering firmly to the base plate which passed the test of 10,000,000 times of strokes. However, the arranging work of the push button elements by inserting into the base plate required 160 seconds.

Comparative Example 2

Blocks of the push button elements obtained in Preliminary Preparation 4, 6 and 7 were divided into 5, 8 or 17 pieces of single push button elements.

These push button elements were arranged by inserting into the openings of the punched base plate processed in the same manner as in Example 9 and coated with a silicone rubber from the side of the lower surface in a manner shown in FIG. 11 at the predetermined spots shown in FIG. 15. Heating was carried out for 30 minutes at 150° C. in an oven to vulcanize the silicone rubber. The covering member of keyboard thus obtained carrying the push button elements firmly adhering to the base plate passed the test of 10,000,000 times of strokes.

The time taken for the arrangement work of the push button elements by inserting into the base plate was 80 seconds.

What is claimed is:

1. A covering member of keyboard comprising a base plate having openings and push button elements fixed each to the peripheral zone of one of the openings, the openings being arranged conforming to the pattern of arrangement of the push buttons.

2. The covering member as claimed in claim 1, in which each of the push button elements is fixed to the peripheral zone of the opening of the base plate using a silicone rubber-based adhesive.

3. The covering member as claimed in claim 1, in which each of the push button elements is fixed to the peripheral zone of the opening of the base plate using a pressure-sensitive adhesive.

4. The covering member as claimed in claim 1, in which each of the push button elements is fixed to the peripheral zone of the opening of the base plate by tailing of a protrusion into a cavity.

5. A covering member of a keyboard comprising a base plate having openings and a unit body carrying push button elements each fixed to the peripheral zone of one of the openings of the base plate, the openings being arranged conforming to a pattern of arrangement of the push button elements.

6. A base plate of a covering member of keyboard mountable on a circuit board having openings conforming to a pattern of arrangement of fixed contact points set up on the circuit board.

* * * * *